March 27, 1962 R. A. DE VIENNE ET AL 3,027,166
SEALING ATTACHMENT FOR SECURING ELECTRICAL CABLES OR THE LIKE
Filed June 16, 1959
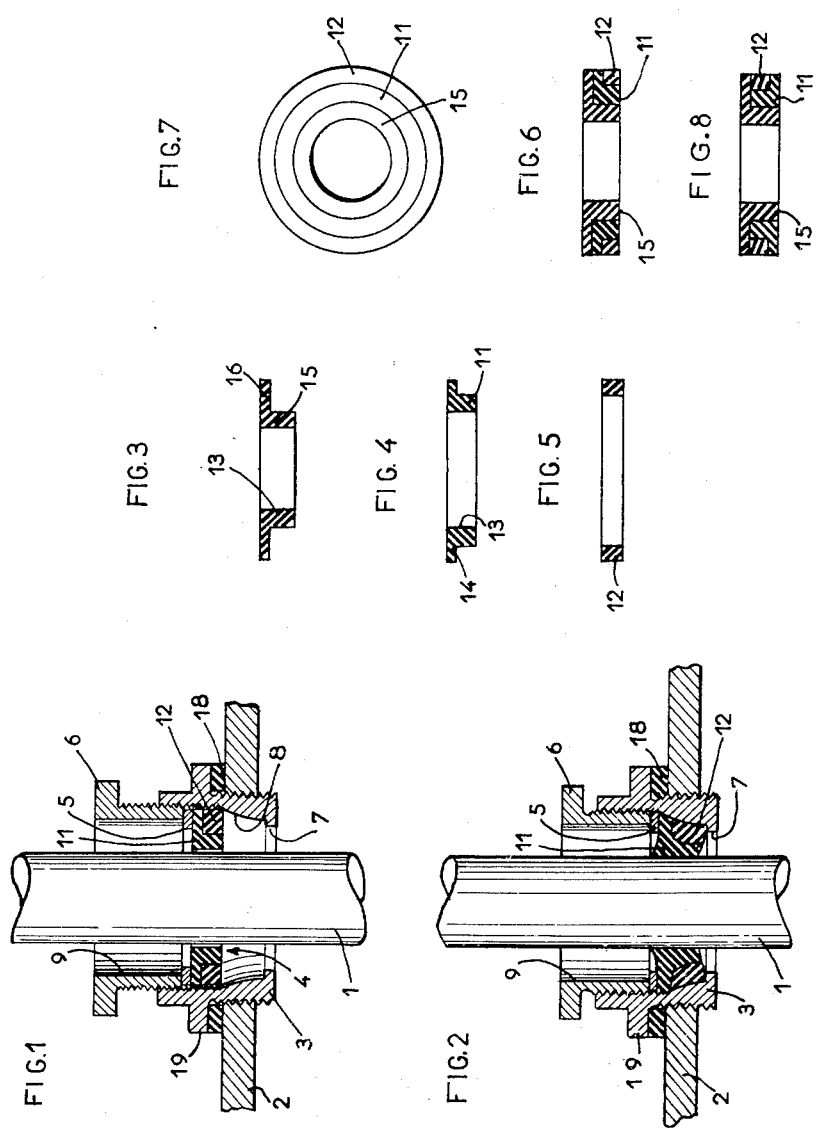

United States Patent Office 3,027,166
Patented Mar. 27, 1962

3,027,166
SEALING ATTACHMENT FOR SECURING ELECTRICAL CABLES OR THE LIKE
Robert Alexandre de Vienne, 8 bis Rue Laurent Pichat, Paris, France; Jean Paul de Vienne, 4 bis Rue Lucien Jeanin, La Garenne-Colombes, France; and Pierre Grenier, 24 Rue Ernest Renan, Colombes, France
Filed June 16, 1959, Ser. No. 820,727
Claims priority, application France June 20, 1958
4 Claims. (Cl. 277—112)

The invention concerns sealing attachments for securing an elongated element such as an electric cable, a braided wire, or a rigid or flexible pipe, in an aperture provided for this purpose, and, more particularly, electrical cables at points where the cable has to pass through an opening in a partition, or be joined to some electrical apparatus.

The object of the invention is to provide a standardized attachment, of the type which permits the efficient securing of cables the diameters of which cover a wide range.

To attain this result one could of course provide, in combination, a standard size attachment, and an assortment of elastic washers of different internal diameters, it being understood that the fitter, at the time of the positioning of the attachment, would have to choose, and place in the body of the attachment, the washer of which the interior diameter corresponded the best to the exterior diameter of the cable to be secured.

A solution such as this has the disadvantage of not permitting the delivery of an attachment completely assembled, ready for use, and able to receive whatever cable it might be likely to have to secure. In fact, only one washer can be already assembled in the attachment, the other washers having to be delivered separately. But this type of attachment is contrary to the normal conditions for accepting specifications, and to the rules of normalization.

To resolve the problem, the inventors have looked for a way to provide an attachment comprising several elastic washers of different diameters, but with these washers being designed and positioned in such a way as to constitute, together, a single composite washer mounted in the attachment and providing for the securing of a cable of minimum diameter, in such a way that, for the fitting of larger cables, it is sufficient to remove one or more elements of the composite washer, until the diameter of the hole of the remaining composite washer corresponds to the diameter of the cable to be secured.

To this end, according to the invention, a composite washer is provided, and is constituted by an assembly of several individual cylindrical washers, fitted one into the other, each washer being housed in the interior of the other, and having a flange of which the exterior diameter is approximately the same as the exterior diameter of the largest washer, in such a way that it is possible to remove, starting from the inside, as many washers as is necessary for it to be possible to make the cable pass through the remaining washer, or washers, these forming, due to the above-mentioned flanges, an asembly holding well together.

The washers can be fitted, one into the other, whatever the orientation, at the same time always obtaining a composite washer of a regular shape, due to the above-mentioned design of the individual washers that comprise the elements of the composite washer.

A composite washer such as this obviates the necessity of having metallic pressure washers of different interior diameters. Whatever is the number of elements constituting the composite washer, the interior diameter of the single metallic pressure washer remains constant, and is determined by the size of the largest cable required to be secured.

The invention will be better understood by reading of the detailed description which follows, and by examination of the annexed drawings which represent, by way of non-limiting examples, several embodiments of the invention.

In the drawings:
FIG. 1 is an axial section of a sealing attachment for cables, according to the invention, shown in its position before being tightened down;
FIG. 2 shows the same attachment, after being tightened down;
FIGS. 3 to 5 are axial sections of individual washers intended for forming a composite washer of the type that is mounted in the attachment shown in FIG. 1;
FIG. 6 is an axial section of the said composite washer;
FIG. 7 is a plan view, from below, corresponding to FIG. 6, and
FIG. 8 is a variant of FIG. 6.

The attachment represented in FIG. 1 is intended for securing, and sealing, an electrical cable 1, at its point of entry into a box, shown partially as 2. The whole assembly of the attachment comprises a body 3, a composite washer 4, a metallic pressure washer 5, and a tightening member 6.

The body 3 is screwed into a threaded hole in the wall of the box 2. Its shape is in the form of a bowl of which the bottom is pierced by a hole 7, the diameter of which is equal to the diameter of the largest cable that can be mounted in the attachment. The interior wall of the body 3, close to the pierced bottom, is of decreasing diameter towards the bottom, and has a curvilinear form 8, convex in the example shown.

The tightening member 6 is screwed into the threaded and reamed-out part of the body 3, and this reamed-out part is also at least equal to the diameter of the largest cable to be secured.

The composite washer 4 is formed of several (two in this example) individual washers, namely, the two washers 11 and 12, of a supple and elastic material, such as natural or synthetic rubber, or an equivalent or plastic material.

The individual washer 11 has a hole 13 (see FIG. 4) of a diameter corresponding to that of the smallest cable to be secured in the attachment, and it has, in the plane of one of its faces, a flange of a diameter approximately equal to the interior diameter of the body 3, in such a way that the said washer can be easily inserted into the body.

The other individual washer 12 has an interior diameter approximately equal to the outer diameter of the main body of the washer 11, and an exterior diameter approximately equal to the exterior diameter of the flange of the washer 11; as far as its thickness is concerned, it is equal to the thickness of the washer 11, not counting the thickness of its flange.

It is thus possible to fit the individual washer 12 on to the individual washer 11, and thus obtain a composite washer of which the interior diameter is equal to the interior diameter of the washer 11, the external diameter is equal to the exterior diameter of the washer 12 and, at the same time equal to the exterior diameter of the flange 14 of the washer 11, and its thickness is equal to the total thickness of the washer 11, not including its flange.

When the whole assembly is fitted, as shown on FIG. 1, if the tightening member 6 is screwed down against the composite washer 4, tightly into the body 3, the composite washer is forced against the convex part 8 of the interior wall, and, at the same time, it is applied with force against the surface of the cable. The metallic washer 5 facilitates the sliding of the tightening member 6 (which turns during the tightening down) against the composite washer 4 (which does not turn).

For securing cables of which the diameter is between the size of the hole in the larger washer 12, and the smaller washer 11, the smaller washer is not used, and only the larger washer 12 is kept in the attachment.

To secure cables of a smaller diameter than the hole of the small washer (but still being within the range of possible deformation of the composite washer), the two washers are kept, one fitted into the other.

One thus has an attachment that can be delivered completely assembled with its composite washer on the inside, and with the possibility of being able to remove, as and when required, one or more of the elements which constitute the composite washer, according to the size of the cable to be secured. It is thus possible to efficiently secure, in the same attachment, cables of various diameters covering a very wide range.

FIG. 6 shows a composite washer comprised of three individual washers 12, 11 and 15, shown respectively in FIGS. 5, 4 and 3; in other words, on the interior of the composite washer in the attachment on FIG. 1, a third individual washer 15 has been added, which also has the same type of flange 16, and of the same diameter as that of the flange 14 of the washer 11.

It is possible to fit the individual washers one inside the other in such a way that all the flanges are on the same side of the composite washer, as in FIG. 6, or so that certain of the flanges are on one side of the composite washer, and some on the other side, as in FIG. 8.

If it is required, it is also possible to have composite washers formed out of more than three individual washers. All the washers, except the one with the largest internal diameter, have a flange, and all these flanges are of the same external diameter. In the embodiment shown, the thickness of each washer (not including the thickness of its flange) is equal to the total thickness of the washer that is fitted onto the outside of it.

In FIGS. 1 and 2, a supplementary washer 18 is shown secured between a shoulder 19 of the body 3 and the outside face of the wall 2 of the box, solely with the aim of ensuring that there can be no leak between the box and the body 3.

It must be understood that the invention is in no way limited to the embodiments described and shown in the drawings, and many modifications and changes may be made therein by those skilled in the art according to the desired applications without departing from the scope of the claims.

What we claim is:

1. A device for attaching to a member having an aperture therein, an elongated element the external diameter of which lies within determinable limits, said device comprising a socket member adapted to be secured in said aperture and having an internally threaded cylindrical wall portion continued by a constricted wall portion, a ring assembly comprising at least two interfitting ring members of elastic material, the outer ring member having a smaller axial length than the inner ring member and having an external diameter less than the internal diameter of the cylindrical wall portion, said inner ring member being provided with an outwardly extending flange portion for axial engagement with said outer ring member, said flange portion and said outer ring member having substantially equal external diameters whereby said assembly is slidably mounted in said cylindrical wall portion, and a ferrule having an externally threaded portion for engagement with said internally threaded cylindrical wall portion, said ferrule upon inward screwing movement in said cylindrical wall portion applying pressure to said assembly forcing it into sliding engagement over said constricted wall portion and causing each said ring member to contract gradually and thereby press the inner cylindrical surface area of the ring membe surrounding the elongated element into engagement therewith.

2. A sealing attachment for securing electrical cables and the like, comprising a bowl-shaped member provided with an axial passage for receiving the cable, a composite ring assembly in engagement with the bottom portion of said bowl-shaped member comprising at least two elastically deformable ring members, one of said ring members encompassing the cable and fitting within the other of said ring members and having a flange portion overlying said other ring member, said flange portion and said other ring member having the same peripheral extent, and a ferrule operatively engageable with the sides of said bowl-shaped member and with said flange portion to compress said ring members to engage said inner ring member in fluid-tight relationship with the cable and said outer ring member and said flange portion as a unitary structure in fluid-tight relationship with each other and with the sides of said bowl-shaped member.

3. An attachment as claimed in claim 2, including a non-elastic washer having the same peripheral extent as said flange portion engageable solely therewith and said ferrule to apply pressure uniformly to said flange portion.

4. An attachment as claimed in claim 2 in which said bowl-shaped portion has a curvilinear convex portion extending peripherally from said bottom portion effective to force said inner ring member into engagement with the cable upon movement of said ferrule towards said bottom portion.

References Cited in the file of this patent

UNITED STATES PATENTS

| 2,371,753 | Fullman | Mar. 20, 1945 |
| 2,444,113 | Pevney | June 29, 1948 |
| 2,806,721 | Fagg | Sept. 17, 1957 |
| 2,868,576 | Boughton | Jan. 13, 1959 |

FOREIGN PATENTS

| 407,451 | Italy | Oct. 11, 1944 |
| 523,310 | Germany | Apr. 22, 1931 |